United States Patent [19]

Walker et al.

[11] Patent Number: 5,014,310

[45] Date of Patent: May 7, 1991

[54] VIDEO SCRAMBLING AND DESCRAMBLING BY VARYING SEQUENCE OF SEGMENTS IN ADJACENT VIDEO INFORMATION LINES

[75] Inventors: Gordon K. Walker, Escondido; William A. Shumate; Krishnanand Kelkar, both of San Diego, all of Calif.

[73] Assignee: General Instrument Corporation, New York, N.Y.

[21] Appl. No.: 455,554

[22] Filed: Dec. 18, 1989

[51] Int. Cl.$^5$ .............................................. H04N 7/16
[52] U.S. Cl. ...................................... 380/10; 380/14; 380/17; 380/20
[58] Field of Search .................... 380/9, 10, 12, 14, 15, 380/17, 20, 36, 37

[56] References Cited

U.S. PATENT DOCUMENTS

| | | | |
|---|---|---|---|
| 4,070,693 | 1/1978 | Shutterly | 380/14 |
| 4,563,702 | 1/1986 | Heller et al. | 380/10 |
| 4,575,754 | 3/1986 | Bar-Zohar | 380/17 X |
| 4,669,117 | 5/1987 | Van Eck | 380/14 |
| 4,736,420 | 4/1988 | Katznelson et al. | 380/11 |
| 4,910,772 | 3/1990 | Matias et al. | 380/20 |

*Primary Examiner*—Bernarr E. Gregory
*Attorney, Agent, or Firm*—Edward W. Callan

[57] ABSTRACT

A video scrambling system scrambles adjacent sequentially odd and even video information lines of a video frame by simultaneously storing in a memory a pair of such adjacent lines; and forming a pair of scrambled video information lines by retrieving from the memory a segment of one of the stored video information lines followed by a segment of the other stored video information line, and by shifting the phase of one of the retrieved segments of the scrambled video information line in relation to the other retrieved segment of said scrambled video information line by an odd multiple of one-half the phase of the chrominance information cycle. This phase shift causes the phase relationship of all segments with respect to the color reference signal to be the same; and as a result there is no differential hue shift in the descrambled signal. In a complementary descrambling system, the two retrieved segments of each descrambled video information line are retrieved consecutively without an intervening phase shift. Security of the scrambled signal against unauthorized descrambling is enhanced by delaying the provision of an encryption keystream to a control unit that sets the cut-point between the segments in accordance with said keystream, and further using the keystream to set the amount of said delay.

15 Claims, 3 Drawing Sheets

VIDEO SCRAMBLING AND DESCRAMBLING BY VARYING SEQUENCE OF SEGMENTS IN ADJACENT VIDEO INFORMATION LINES

BACKGROUND OF THE INVENTION

The present invention generally pertains to video signal processing and is particularly directed to improved video signal scrambling and descrambling systems.

One technique for scrambling video signals is described in U.S. Pat. No. 4,070,693 to Shutterly. In accordance with the technique described therein, video information is scrambled by storing a video information line in a memory and then forming a scrambled video information line by retrieving the video information from the memory in a sequence different from the sequence within the line in which the information was stored. The segment at the beginning position of the stored video information line is retrieved at the last position of the scrambled video information line and the segment at the last position of the stored video information line is retrieved at the beginning position of the scrambled video information line. The respective lengths of the retrieved segments are varied from one line to the next in response to a randomly generated coded control signal.

A technique for more thoroughly scrambling video signals is described in U.S. Pat. No. 4,563,702 to Heller and Paik. In accordance with the technique described therein, video information is scrambled by storing a group of video information lines in a memory and then forming a group of scrambled video information lines by retrieving the video information from the memory in a sequence different from the sequence within the group of lines in which the information was stored so as to interchange segments between different video information lines. A scrambled video information line includes segments retrieved from different stored video information lines within each stored group. The segment at the beginning position of one stored video information line is retrieved at the last position of one scrambled video information line and the segment at the last position of another stored video information line is retrieved at the beginning position of the one scrambled video information line. The respective lengths of the retrieved segments are varied from one group of line to the next group in response to a randomly generated encryption keystream. Each group of stored video information lines does not include adjacent video information lines within a video frame, however, since within a video frame, the phase of the chrominance information cycle (as defined by the color subcarrier frequency) of the sequentially odd video information lines is 180 degrees out of phase with the chrominance information cycle of the adjacent sequentially even video information lines; whereby as a result of this out-of-phase relationship, the effect of chrominance leakage varies between the scrambled segments and upon descrambling causes a differential hue shift across a descrambled line or from line to line.

Chrominance leakage is the leakage of a 3.58 MHz local color subcarrier reference signal into the chrominance information. With respect to the sync tips of each video information line, the local color subcarrier reference signal has a different phase relationship between adjacent sequentially odd and even lines of a video frame. Therefore, the phase relationship of the color subcarrier reference signal to the chrominance information is different for the segments of a scrambled video information line respectively derived from different adjacent video information lines; and combining segments from different adjacent lines into a single line causes a hue shift between the different segments when the scrambled signal is descrambled to reconstruct the video signal.

Because of this chrominance leakage phenomenon, each group of stored video information lines within which segments are interchanged in accordance with the more thorough scrambling technique described in said U.S. Pat. No. 4,563,702 includes only sequentially odd video information lines or only sequentially even video information lines, thereby making it necessary to provide sufficient memory capacity for simultaneously storing both a group of odd video information lines and a group of even video information lines.

SUMMARY OF THE INVENTION

The present invention utilizes a video scrambling technique by which a single scrambled video information line is formed by retrieving segments from both sequentially odd and even video information lines within a video frame without suffering differential hue shift upon descrambling to thereby reduce the memory capacity requirement of the prior art when scrambling by interchanging segments from different video information lines.

The present invention provides a system for scrambling video information lines in a television signal containing a plurality of sequential video information lines for a video frame. This system includes a memory; means for simultaneously storing in the memory a group of video information lines for a video frame, including both sequentially odd and even video information lines, wherein each video information line contains luminance information and chrominance information which is modulated at a given color subcarrier frequency, wherein each video information line includes a given even number of video information samples for each chrominance information cycle as defined by the color subcarrier frequency, and wherein the chrominance information cycle of said stored odd video information lines is out of phase with the chrominance information cycle of said stored even video information lines; and means for forming scrambled video information lines by retrieving from the memory a segment of one of said stored odd video information lines followed by a segment of one of said stored even video information lines to form a scrambled video information line, and by shifting the phase of one of the retrieved segments of the scrambled video information line in relation to the other retrieved segment of said scrambled video information line by an odd multiple of one-half said given even number of video information samples.

This phase shift causes the phase relationship of all segments with respect to the color reference signal to be the same; and as a result there is no differential hue shift in the descrambled signal.

The present invention further provides a system for descrambling a video signal that is scrambled by the above-described video scrambling system of the present invention. In a complementary descrambling system, the two retrieved segments of each descrambled video information line are retrieved consecutively without an intervening phase shift.

One feature of the present invention is that the scrambling system of the present invention preferably includes means for generating a waveshaping information segment for providing a smooth transition between said retrieved segments of the scrambled video information line; wherein the means for forming the scrambled video information lines is adapted for inserting said generated waveshaping information segment into the scrambled video information line between said retrieved segments of said scrambled video information line; and wherein said inserted waveshaping information segment is of a duration equal to said odd multiple of one-half said given even number of video information samples.

Another feature of the present invention is that in the scrambling system and/or the descrambling system, the memory may have a capacity that is limited to the storage of one pair of video information lines; wherein the storing means is adapted for storing two video information lines in locations of the memory from which said retrieved segments are retrieved by the forming means immediately upon said retrieved segments being retrieved from said locations.

In another aspect, the present invention provides a more secure system for scrambling video information lines in a television signal containing a plurality of video information lines. This system includes a memory; means for storing video information lines in the memory in a given sequence; means for forming scrambled video information lines by retrieving from the memory stored segments of said stored video information lines in a sequence different from the sequence in which said segments were stored; means for providing encryption keystream data; means for generating an encryption keystream from the encryption keystream data; means for setting a cutpoint between the segments retrieved from said stored video information lines in accordance with said encryption keystream; means for transmitting said encryption keystream data and said scrambled video information lines; means for delaying provision of said encryption keystream to said means for setting the cutpoint; and means for determining said delay in accordance with said encryption keystream.

The present invention further provides a descrambling system for descrambling video signals that are scrambled by the more secure scrambling system of this aspect of the present invention.

Additional features of the present invention are described in relation to the description of the preferred embodiment.

DESCRIPTION OF THE PREFERRED EMBODIMENT

Figure 1:
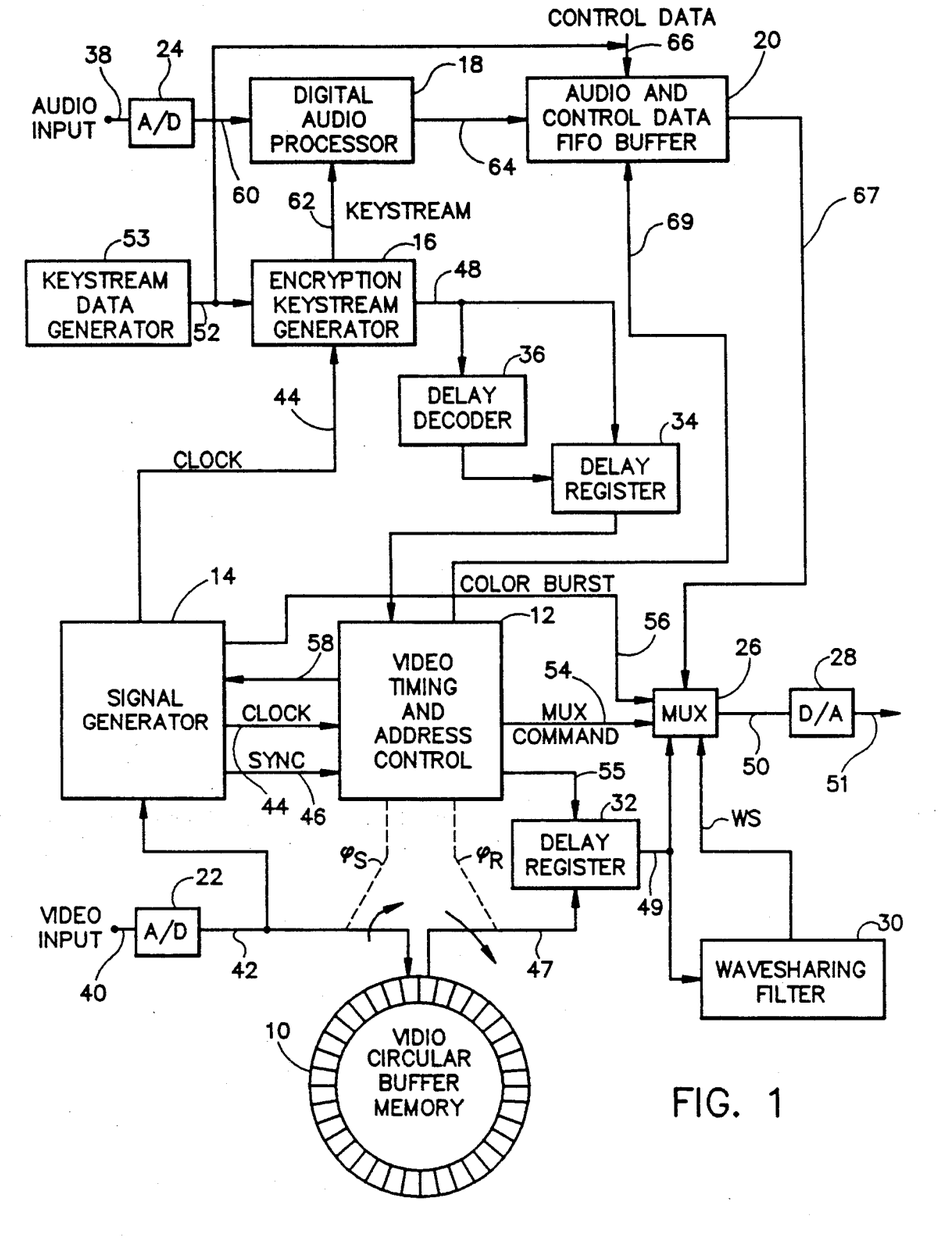
FIG. 1 is a block diagram of a preferred embodiment of a scrambling system according to the present invention.

Referring to FIG. 1, a preferred embodiment of a scrambling system according to the present invention includes a video circular buffer memory 10, a video timing and address control unit 12, a signal generator 14, an encryption keystream generator 16, a digital audio processor 18, an audio and control data FIFO (first-in-first-out) buffer 20, a video analog-to-digital (A/D) converter 22, an audio A/D converter 24, a multiplexer 26, a digital-to-analog (D/A) converter 28, a waveshaping filter 30, a first variable delay register 32, a second variable delay register 34, a delay decoder 36 and a keystream data generator 53.

The scrambliing system receives an audio input signal 38 and a video input signal 40. The received video input signal 40 is a standard format analog color video signal, having a plurality of horizontal video information lines, each of which contains luminance information and chrominance information which is modulated at a given color subcarrier frequency, and wherein the chrominance information cycle of one video information line, as defined by the color subcarrier frequency, is 180 degrees out of phase with the chrominance information cycle of each adjacent video information line.

The A/D converter 22 converts the received video input signal 40 into a digital video signal 42, wherein each video information line includes a given even number of video information samples for each chrominance information cycle. In the preferred embodiment, this given even number is four.

Successive pairs of adjacent video information lines of each video frame of the digital video signal 42 are simultaneously stored in the memory 10. In one embodiment, the memory 10 has a capacity for storing only two video information lines. In alternative embodiments the group of simultaneously stored video information lines may include more than two lines, and/or the memory 10 may have a capacity for storing more than two video information lines. Only the video information portions of each horizontal video line are stored in the memory 10.

The storage of the video information lines in the memory 10 is controlled by the video timing and address control unit 12. The control unit 12 controls the timing of such storage in accordance with a clock signal 44 and a sync signal 46 provided by the signal generator 14 in response to sync and timing data received by the signal generator 14 from the digital video input signal 42. The control unit 12 provides an address pointer $\phi_S$ that indicates the addresses of successive locations in the memory 10 in which successive video information samples of the video information lines are stored.

Figure 2A:
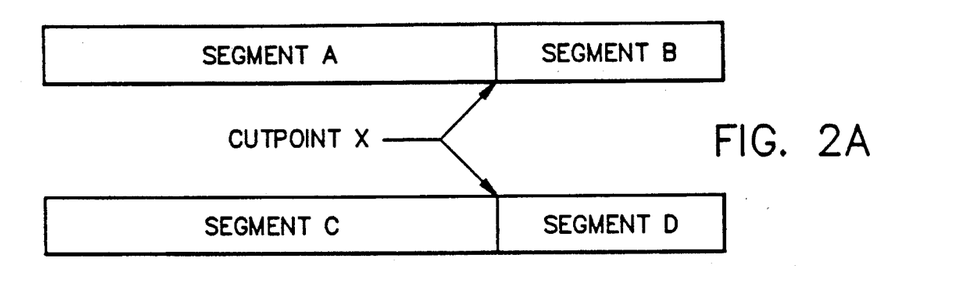
FIG. 2A illustrates the segmenting of two stored adjacent video information lines.
Figure 2B:
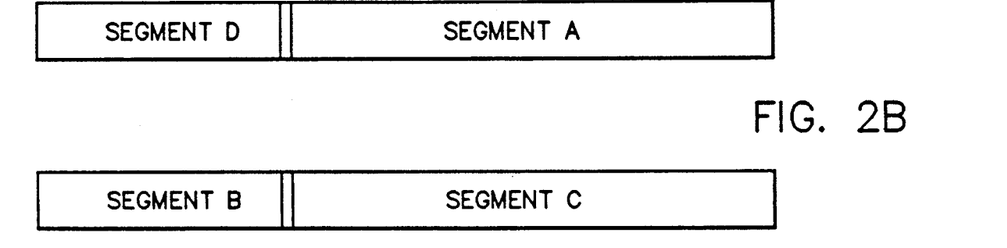
FIG. 2B illustrates the formation of two scrambled video information lines with segments retrieved from the stored video information lines of FIG. 2A.

A scrambled digital video signal is formed by retrieving from the memory 10 a segment of one of the stored video information lines followed by a segment of the other stored video information line to form one scrambled video information line, and by retrieving from the memory 10 the remaining segment of other stored video information line followed by the remaining segment of the one stored video information line to form another scrambled video information line. This is illustrated in FIGS. 2A and 2B. Referring to FIG. 2A, a first stored video information line includes segments A and B; and a second stored video information line includes segments C and D. Referring to FIG. 2B, a first scrambled video information line includes segments D and A; and a second scrambled video information line includes segments B and C.

The cutpoint X between the segments A and B, C and D is the same in each video information line of a pair of simultaneously stored video information lines, as shown in FIG. 2A. Each video information line includes 188 possible cutpoints, in accordance with there being 748 video information samples, which are sampled at a rate of 14 MHz, whereby there are four video information samples for each chrominance information cycle. There must be an integral number of chrominance information cycles between cutpoints.

The cutpoint is set by the control unit 12 and varied from one pair, or from multiple pairs, of stored video information lines to the next in accordance with the content of an 8-bit encryption keystream 48 provided by the keystream generator 16.

The retrieval of the stored video information lines from the memory 10 to form the scrambled video information line is controlled by the video timing and address control unit 12. The control unit 12 controls the timing of such retrieval in accordance with the clock signal 44, the sync signal 46 provided by the signal generator 14, and a predetermined timing pattern stored in the timing and address control unit 12. The control unit 12 provides an address pointer $\phi_R$ that indicates the addresses of successive locations in the memory 10 from which successive video information samples of the stored video information lines are retrieved in accordance with the encryption keystream 48 provided by the keystream generator 16.

The keystream generator 16 provides the encryption keystream 48 from keystream data 52 from the keystream data generator 53 and is clocked by the same clock signal 44 as the video timing and address control unit 12.

In each scrambled video information line, the phase of one of the retrieved segments is shifted in relation to the other retrieved segment by an odd multiple of one-half said given even number of video information samples. In the preferred embodiment the given number is four, and the phase shift is six samples. The beginning of the second retrieved segment of each scrambled video information line is delayed by the video timing and address control unit 12 for a six-sample duration from the end of the first retrieved segment of the scrambled video information line; and a waveshaping information segment WS is inserted between the two retrieved video information segments D and A, B and C, as shown in FIG. 2B.

Because the beginning of the second retrieved segment of each scrambled video information line is delayed in relation to the end of the first retrieved segment of the scrambled video information line, it is necessary to pass the segments 47 retrieved from the memory 10 through the variable delay register 32. The delayed retrieved segments 49 are provided by the delay register 32 to the multiplexer 26 and the waveshaping filter 30.

The waveshaping filter 30 generates the waveshaping information segment WS from the delayed scrambled video information line segments 49 retrieved from the memory 10 to provide a smooth transition between the retrieved segments of each scrambled video information line.

Figure 3:
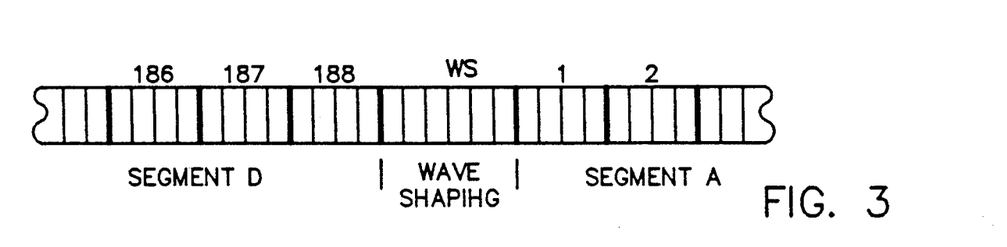
FIG. 3 illustrates the insertion of a waveshaping information segment between two retrieved segments having a phase-shifted relationship to form a scrambled video information line.

The multiplexer 26 forms the scrambled video information lines in a scrambled television signal 50 by inserting the generated waveshaping information segment WS provided by the waveshaping filter 30 into the scrambled video information line 50 between the delayed retrieved video information segments 49 retrieved from the memory 10. The video timing and address control unit 12 controls the operation of the multiplexer 26 by MUX command signals 54 and controls the amount of delay provided by the variable delay register 32 by delay control signals 55. The inserted waveshaping information segment is of a duration equal to six video information samples. FIG. 3 shows a six-sample waveshaping information segment WS inserted between the end of segment D and the beginning of segment A in a scrambled video information line. In FIG. 3, alternative cutpoints in the retrieved video information are indicated by the heavy lines, which are spaced apart by every four video information samples. As noted above, there are 188 possible cutpoints in each stored video information line.

The video timing and address control unit 12 causes two adjacent video information lines to be stored in the locations of the memory 10 from which the retrieved segments are retrieved immediately upon the retrieved segments being retrieved from such locations. This is illustrated in the circular timing diagram of FIG. 4. First a sequentially first video information line including segments $1_A$ and $1_B$ are stored in the memory 10. Then a sequentially second adjacent video information line including segments $2_C$ and $2_D$ are stored in the memory 10. Then a first pair of scrambled video information lines are formed by cutting the first and second stored video information lines at cutpoints X and retrieving segment $2_D$ followed by segment $1_A$ to form a first scrambled video information line, and retrieving segment $1_B$ followed by segment $2_C$ to form a second scrambled video information line. Upon the video information segments that form the first and second scrambled video information lines being retrieved from the memory 10, another pair of adjacent video information lines are stored in the memory 10. Upon the commencement of the retrieval of segment $2_D$, a sequentially third video information line including segments $3_A$ and $3_B$ is stored in the memory 10; and upon the commencement of the retrieval of segment $1_B$, a sequentially fourth video information line including segments $4_A$ and $4_B$ is stored in the memory 10. Then a second pair of scrambled video information lines are formed by cutting the third and fourth stored video information lines at cutpoints X' and retrieving segment $4_D$ followed by segment $3_A$ to form a third scrambled video information line, and retrieving segment $3_B$ followed by segment $4_C$ to form a fourth scrambled video information line.

Figure 4:
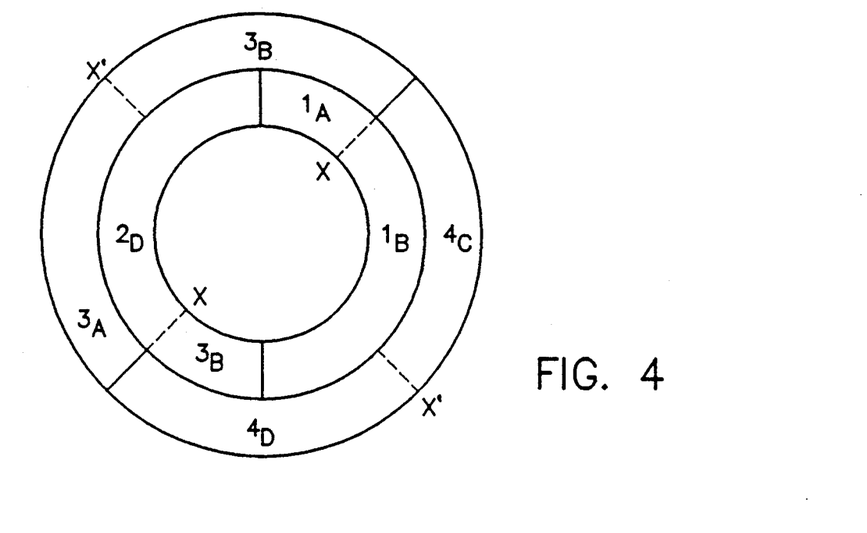
FIG. 4 is a circular timing diagram illustrating the sequence of storage of two successive pairs of video information lines and the retrieval of segments therefrom to form two successive pairs of scrambled or descrambled video information lines, with the second pair of lines being stored upon the segments of the first pair of lines being retrieved.

The segments used to form the scrambled video information lines are retrieved continuously from the memory 10 as the next pair of adjacent video information lines are stored in the memory 10. The delay between the retrieved first and second segments of each scrambled video information line is effected by the delay register 32 in response to delay control signals from the video timing and address control unit 12, as discussed above.

Overlap sections of the video information line are added to the beginning and end of the scrambled video information lines in order to offset the effects of any uncertainty in the sampling points used for video reconstruction. Any difference in the sample points used by the descrambling system from the sample points used by the scrambling system shows up as an error in the location of the cutpoint. Without overlap sections, this error would cause the reconstructed video to have erroneous information at the cutpoint. By introducing the overlap samples, the sampling uncertainty causes only a slight shift in the active video boundaries which appears as a small shift in the reconstructed video line, with waveshaping samples inserted into the short side. This shift is masked by the television signal overscan regions. A double buffered memory 10 is used to provide such overlapping.

Another reason for adding the overlap is to allow any filters in the system to make a smooth transition into active video. In an unscrambled waveform, the transitions into active video are at the edges of the picture and are hidden by the overscan region. However, in the scrambled waveform, the transitions into active video represent the cutpoint in the reconstructed waveform. In this situation, any ringing in filters caused by the transition would be highly visible. The overlap provides a smooth active video segment for the filters to settle.

Waveshaping segments are included into the active video waveform to make a smooth transition from one level to another. In addition to the waveshaping segment introduced between the retrieved video information segments of each scrambled video information line, as discussed above, waveshaping segments are added into the scrambled waveform to provide a transition from the color burst reference signal to the retrieved video information segments and to provide a three-sample transition from the retrieved video information line segments to the end of the horizontal blanking interval of the video signal.

The scrambled television signal 50 provided at the output of the multiplexer 26 further includes color burst information, scrambled audio information and control data.

A color burst information signal 56 is generated by the signal generator 14 in accordance with sync and timing information received from the digital video input signal 42. The timing of the color burst signal 56 is controlled by a timing signal 58 provided by the timing and control unit 12 in accordance with the stored predetermined timing pattern to cause the color burst signal 56 to be multiplexed by the multiplexer 26 with the video information segments retrieved from the memory 10 so as to be inserted in a non-video segment that precedes the retrieved segments of each scrambled video information line.

The audio signal 38 is converted into a digital audio signal 60 by the D/A converter 24. The digital audio processor 18 compresses the digital audio signal 60 and also scrambles the compressed digital audio signal in accordance with an encryption keystream 62 from the keystream generator 16. The compressed and scrambled digital audio signal is further processed for error detection and correction. Audio information 64 from the audio processor 18 is stored in the audio and control data FIFO buffer memory 20 together with control data 66. The control data 66 includes the keystream data 52 together with other data required for descrambling the scrambled television signal 50. The combined audio information and control data 67 are retrieved from the memory 20 at times prescribed by a control signal 69 provided from the video timing and address control unit 12 in accordance with the encryption keystream 48 and the predetermined timing pattern stored in the control unit 12 to cause the audio information 64 and control data 66 to be multiplexed by the multiplexer 26 with the video information segments retrieved from the memory 10 so as be inserted in the non-video segment that precedes the retrieved video information segments.

The scrambled digital television signal 50 provided at the output of the multiplexer 26 is converted into an analog television signal 51 by the D/A converter 28.

In order to enhance the security of the scrambled video signal against unauthorized descrambling, the provision of the encryption keystream 48 to the video timing and address control unit 12 is delayed by the delay register 34. The amount of such delay is controlled by the delay decoder 36 in response to the encryption keystream 48. The delay register 34 delays provision of the encryption keystream to the video timing and address control unit 12 for a predetermined number of video information lines regardless of the encryption keystream 48 and further delays provision of the encryption keystream to the video timing and address control unit 12 for an additional number of video information lines as set by the delay decoder 36 in response to the encryption keystream 48.

Delaying provision of the keystream 48 to the video timing and address control unit 12 deters unauthorized attempts to descramble the scrambled video information lines by a technique of trying to determine the cutpoint in each video information line by analyzing the video information being transmitted, and using the cutpoint that is so determined to generate a keystream for provision to a video timing and address control unit of an unauthorized descrambler in order to descramble the scrambled video information lines. By variably delaying the encryption keystream 48 before it is used for setting the cutpoint, the process of analyzing the transmitted video information to determine the cutpoint and then generating a keystream from the determined cutpoint becomes much more difficult. A would-be video pirate would have to delay the input scrambled television signal in order to offset the delay in the provision of the keystream to the video timing and address control unit 12. Since the variable delay register 34 delays only 8 bits of keystream input for each pair of adjacent video information lines, while the pirate must delay 1500 samples for each two lines, the pirate must match the capacity of the delay register 34 by a factor of 1500:1. This makes this sort of unauthorized descrambling attack very expensive since the would-be pirate have to add considerable expensive video memory to account for the additional delay of the predetermined number of lines that is provided by the delay register 34 regardless of the delay set by the encryption keystream.

Figure 5:
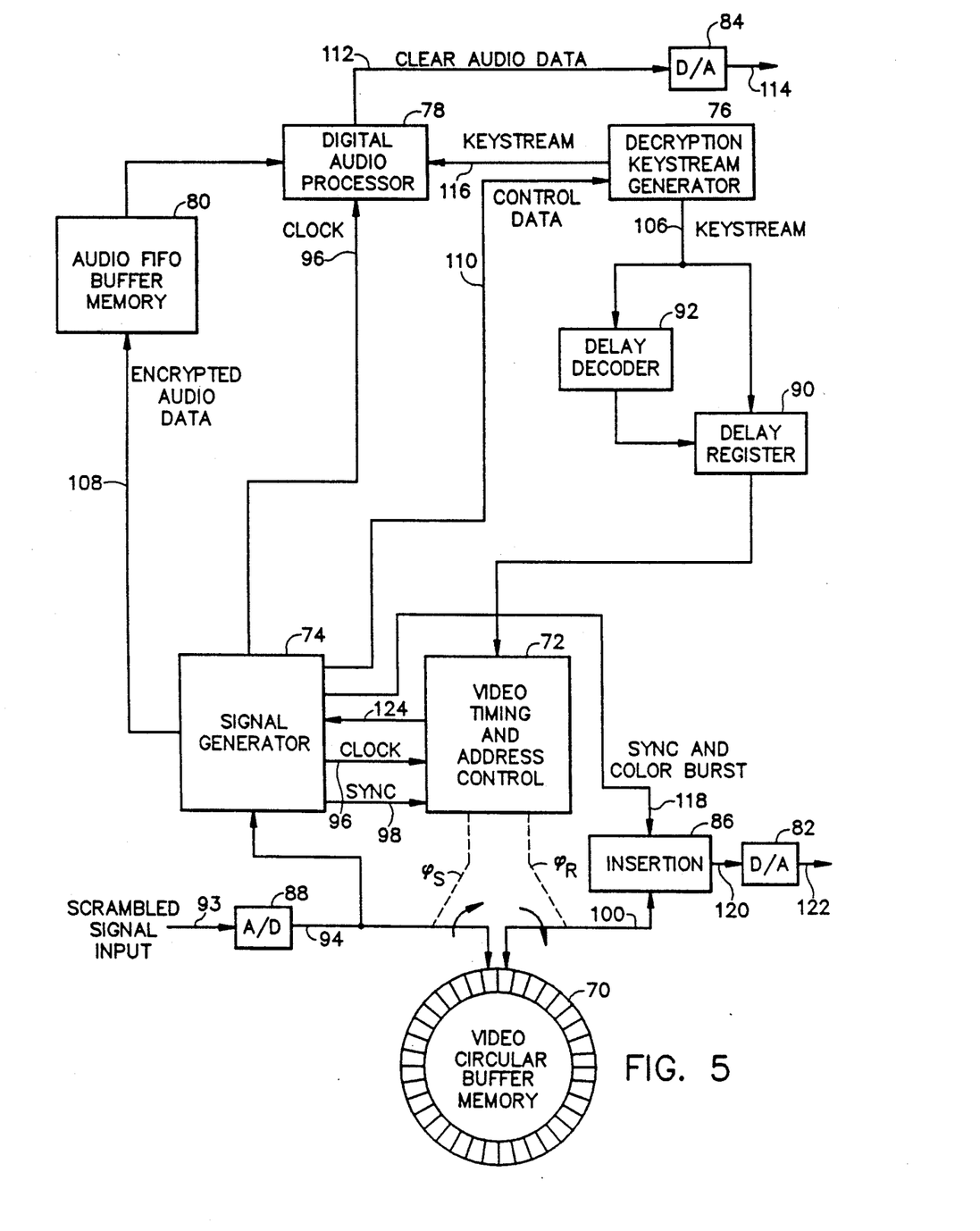
FIG. 5 is a block diagram of a preferred embodiment of a descrambling system according to the present invention.

Referring to FIG. 5, a preferred embodiment of a descrambling system according to the present invention includes a video circular buffer memory 70, a video timing and address control unit 72, a signal generator 74, a decryption keystream generator 76, a digital audio processor 78, a audio FIFO buffer memory 80, a D/A converter 82, a D/A converter 84, a signal insertion unit 86, an A/D converter 88, a variable delay register 90, and a delay decoder 92.

The descrambling system receives a scrambled input television signal 93. The A/D converter 88 converts the scrambled input signal 93 into a digital signal 94 having video information segments and non-video information segments corresponding to the like portions of the scrambled television signal 50 provided in the scrambling system of FIG. 1.

Successive pairs of the received scrambled video information lines in the received scrambled digital television signal 94 are simultaneously stored in the memory 70. The memory 70 has a capacity for storing only two scrambled video information lines. In alternative embodiments the group of simultaneously stored video information lines may include more than two lines.

Only the video information portions of each horizontal video line are stored in the memory 70. The waveshaping segment WS that is received between the video information segments of each scrambled video information line in the received scrambled television signal 94 is not stored. The two segments of each scrambled video information line are stored consecutively in the memory 70 so that within an array of successive memory locations in the memory 70, the beginning of one segment immediately follows the end of the other segment, and thereby eliminates the phase shift between the two segments that existed in the scrambled video information line.

The storage of the scrambled video information lines in the memory 70 is controlled by the video timing and address control unit 72. The control unit 72 controls the timing of such storage in accordance with a clock signal 96 and a sync signal 98 provided by the signal generator 74 in response to sync and timing data received by the signal generator 74 from the color burst information and vertical reference data in the scrambled video input signal 94.

The control unit 72 provides an address pointer $\phi_S$ that indicates the addresses of successive locations in the memory 70 in which successive video information samples of the scrambled video information lines are stored.

A descrambled digital video signal is formed by retrieving from the memory 70 a segment of one of the stored scrambled video information lines followed immediately by a segment of the other stored scrambled video information line to form one descrambled video information line, and by retrieving from the memory 70 the remaining segment of other stored scrambled video information lines followed immediately by the remaining segment of the one stored scrambled video information line to form another descrambled video information line. This is the reverse of the process by which the originally provided video information lines are scrambled by the scrambling system of FIG. 1, as illustrated in FIGS. 2A and 2B.

The descrambled video information lines 100 are provided to the insertion unit 86. Within each descrambled video information line 100, the beginning of one retrieved segment immediately follows the end of the other retrieved segment.

As in the scrambling system of FIG. 1, the cutpoint between the retrieved segments is set by the control unit 72 and varied from one pair of stored video information lines to the next in accordance with the content of an 8-bit decryption keystream 106 provided by the keystream generator 76.

The retrieval of the stored video information lines from the memory 70 to form the descrambled video information lines 100 is controlled by the video timing and address control unit 72. The control unit 72 controls the timing of such retrieval in accordance with the clock signal 96 and the sync signal 98 provided by the signal generator 74. The control unit 72 provides an address pointer $\phi_R$ that indicates the addresses of successive locations in the memory 70 from which successive video information samples of the stored scrambled video information lines are retrieved in accordance with the decryption keystream 106 provided by the keystream generator 76.

The keystream generator 76 generates the decryption keystream 106 from the same keystream data as used for generation of the keystream 48 by the keystream generator 16 in the scrambling system of FIG. 1, whereby the decryption keystream 106 is identical to the encryption keystream 48. This keystream data is included in control data 110 extracted from the received scrambled television signal by the signal generator 74. The keystream generator 76 is clocked by the same clock signal 96 as the video timing and address control unit 72.

Complementary to the scrambling system of FIG. 1, the provision of the decryption keystream 106 to the video timing and address control unit 72 is delayed by the delay register 90. The amount of such delay is controlled by the delay decoder 92 in response to the decryption keystream 106. The delay register 90 delays provision of the decryption keystream to the video timing and address control unit 72 for a predetermined number of video information lines regardless of the decryption keystream 106 and further delays provision of the decryption keystream to the video timing and address control unit 72 for an additional number of video information lines as indicated by the delay decoder 92 in response to the decryption keystream 106.

The video timing and address control unit 72 causes two adjacent video information lines to be stored in the locations of the memory 70 from which the retrieved segments are retrieved immediately upon the retrieved segments being retrieved from such locations, in the same manner as described above with reference to FIG. 4 for storage and retrieval of successive pairs of video information in the scrambling system of FIG. 1.

The signal processor 74 extracts scrambled audio information 108 and control data 110 from the scrambled input television signal 94.

The extracted scrambled audio information 108 is buffered in the FIFO memory 80 and then descrambled and otherwise processed by the digital audio processor 78 to provide a digital audio signal 112, which is converted into an analog audio output signal 114 by the D/A converter 84. The digital audio processor 78 is clocked by the clock signal 96 from the signal processor 74 and descrambles the scrambled audio signal in accordance with an decryption keystream 116 generated by the decryption keystream generator 76.

The signal processor 74 also generates color burst and sync information signals 118 that are inserted by the signal insertion unit 86 prior to the insertion of each descrambled video information line 100 to provide a composite descrambled digital video signal 120. The composite digital video signal 120 is converted by the D/A converter 82 into a standard format analog video output signal 122.

The timing of the color burst and sync information signal 118 is controlled by a timing signal 124 provided by the timing and control unit 72 to cause the color burst and sync information signal 118 to be inserted in a non-video segment that precedes the retrieved segments of each descrambled video information line.

We claim:

1. A system for scrambling video information lines in a television signal containing a plurality of sequential video information lines for a video frame, comprising a memory;

means for simultaneously storing in the memory a group of video information lines for a video frame, including both sequentially odd and even video information lines, wherein each video information line contains luminance information and chrominance information which is modulated at a given color subcarrier frequency, wherein each video information line includes a given even number of video information samples for each chrominance information cycle as defined by the color subcarrier frequency, and wherein the chrominance information cycle of said stored odd video information lines is out of phase with the chrominance information cycle of said stored even video information lines; and means for forming scrambled video information lines by retrieving from the memory a segment of one of said stored odd video information lines followed by a segment of one of said stored even video information lines to form a scrambled video information line, and by shifting the phase of one of the retrieved segments of the scrambled video information line in relation to the other retrieved segment of said scrambled video information line by an odd multiple of one-half said given even number of video information samples.

2. A system according to claim 1, further comprising means for generating a waveshaping information segment for providing a smooth transition between said retrieved segments of the scrambled video information line;

wherein the means for forming the scrambled video information lines is adapted for inserting said generated waveshaping information segment into the scrambled video information line between said retrieved segments of said scrambled video information line; and wherein said inserted waveshaping information segment is of a duration equal to said odd multiple of one-half said given even number of video information samples.

3. A system according to claim 1, wherein the memory has a capacity that is limited to the storage of one pair of adjacent video information lines; and wherein the storing means are adapted for storing two adjacent video information lines in locations of the memory from which said retrieved segments are retrieved by the forming means, immediately upon said retrieved segments being retrieved from said locations.

4. A system according to claim 1, further comprising means for providing encryption keystream data;

means for generating an encryption keystream from the encryption keystream data;

means for setting a cutpoint between the segments retrieved from said stored video information lines in accordance with said encryption keystream;

means for transmitting said encryption keystream data and said scrambled video information lines;

means for delaying provision of said encryption keystream to said means for setting the cutpoint; and means for setting said delay in accordance with said encryption keystream.

5. A system according to claim 4, wherein the delaying means are adapted for delaying said provision of the encryption keystream to said means for setting the cutpoint for a predetermined number of video information lines regardless of the encryption keystream and for further delaying said provision of the encryption keystream to the means for setting the cutpoint for an additional number of video information lines as indicated by the encryption keystream.

6. A system for descrambling video information lines in a scrambled television signal, in which said video information lines were scrambled by simultaneously storing in a first memory a group of sequential video information lines for a video frame, wherein each video information line contains luminance information and chrominance information which is modulated at a given color subcarrier frequency, wherein each video information line includes a given even number of video information samples for each chrominance information cycle as defined by the color subcarrier frequency, and wherein the chrominance information cycle of said stored sequentially odd video information lines is out of phase with the chrominance information cycle of said stored sequentially even video information lines; and by forming scrambled video information lines by retrieving from the first memory a segment of one of said stored odd video information lines followed by a segment of one of said stored even video information lines to form a scrambled video information line, and by shifting the phase of one of the retrieved segments of the scrambled video information line in relation to the other retrieved segment of said scrambled video information line by an odd multiple of one-half said given even number of video information samples, said descrambling system comprising a second memory;

means for simultaneously storing in the second memory a group of said scrambled video information lines; and means for forming descrambled video information lines by retrieving from the second memory a segment of one of said stored scrambled video information lines followed immediately by a segment of another of said stored scrambled video information lines to form a descrambled video information line.

7. A system according to claim 6, wherein the second memory has a capacity this is limited to the storage of one pair of scrambled video information lines; and wherein the storing means is adapted for storing two scrambled video information lines in locations of the memory from which said retrieved segments are retrieved by the forming means immediately, upon said retrieved segments being retrieved from said locations.

8. A system according to claim 6 for descrambling said video information lines, wherein during the scrambling thereof a cutpoint between segments retrieved from said stored video information lines was set in accordance an encryption keystream, wherein the encryption keystream was generated from encryption keystream data that was transmitted with said scrambled video information lines, and wherein provision of said encryption keystream for setting the cutpoint was delayed in accordance with said encryption keystream, the system further comprising means for receiving said transmitted encryption keystream data;

means for generating from the received encryption keystream data, a decryption keystream that is identical to said encryption keystream;

means for setting said cutpoint between the segments of said stored scrambled video information lines in accordance with said decryption keystream;

means for delaying provision of said decryption keystream to said means for setting the cutpoint; and means for setting said delay in accordance with said decryption keystream.

9. A system according to claim 8 for descrambling said video information lines, wherein during the scrambling thereof said provision of the encryption keystream to said means for setting the cutpoint was delayed for a predetermined number of video information lines regardless of the encryption keystream and further delayed for an additional number of video information lines as indicated by the encryption keystream;

wherein within the descrambling system, the delaying means are adapted for delaying said provision of the decryption keystream to said means for setting the cutpoint for said predetermined number of lines video information regardless of the decryption keystream and for further delaying said provision of the decryption keystream to the means for setting the cutpoint for an additional number of video information lines as indicated by the decryption keystream.

10. A system for scrambling and descrambling video information lines in a television signal containing a plurality of sequential video information lines for a video frame, comprising a scrambling system, comprising
  a first memory;
  means for simultaneously storing in the memory a group of adjacent video information lines for a video frame, including both sequentially odd and even video information lines, wherein each video information line contains luminance information and chrominance information which is modulated at a given color subcarrier frequency, wherein each video information line includes a given even number of video information samples for each chrominance information cycle as defined by the color subcarrier frequency, and wherein the chrominance information cycle of said stored odd video information lines is out of phase with the chrominance information cycle of said stored even video information lines; and
  means for forming scrambled video information lines by retrieving from the memory a segment of one of said stored odd video information lines followed by a segment of one of said stored even video information lines to form a scrambled video information line, and by shifting the phase of one of the retrieved segments of the scrambled video information line in relation to the other retrieved segment of said scrambled video information line by an odd multiple of one-half said given even number of video information samples; and a descrambling system, comprising
  a second memory;
  means for simultaneously storing in the second memory a group of said scrambled video information lines; and
  means for forming descrambled video information lines by retrieving from the second memory a segment of one of said stored scrambled video information lines followed immediately by a segment of another of said stored scrambled video information lines to form a descrambled video information line.

11. A system according to claim 10, wherein the second memory has a capacity that is limited to the storage of one pair of scrambled video information lines; and wherein the storing means of the descrambling system is adapted for storing said two scrambled video information lines in locations of the second memory from which said retrieved segments are retrieved by the forming means, immediately upon said retrieved segments being retrieved from said locations.

12. A system for scrambling video information lines in a television signal containing a plurality of video information lines, comprising a memory;

means for storing video information lines in the memory in a given sequence;

means for forming scrambled video information lines by retrieving from the memory stored segments of said stored video information lines in a sequence different from the sequence in which said segments were stored;

means for providing encryption keystream data;

means for generating an encryption keystream from the encryption keystream data;

means for setting a cutpoint between the segments retrieved from said stored video information lines in accordance with said encryption keystream;

means for transmitting said encryption keystream data and said scrambled video information lines;

means for delaying provision of said encryption keystream to said means for setting the cutpoint; and means for setting said delay in accordance with said encryption keystream.

13. A system according to claim 12, wherein the delaying means are adapted for delaying said provision of the encryption keystream to said means for setting the cutpoint for a predetermined number of video information lines regardless of the encryption keystream and for further delaying said provision of the encryption keystream to the means for setting the cutpoint for an additional number of video information lines as indicated by the encryption keystream.

14. A system for descrambling video information lines in a scrambled television signal, in which said lines were scrambled by storing video information lines in the memory in a given sequence; forming scrambled video information lines by retrieving from the memory stored segments of said stored video information lines in a sequence different from the sequence in which said segments were stored, wherein during the scrambling of the video information lines a cutpoint between said segments retrieved from said stored video information lines was set in accordance an encryption keystream, wherein the encryption keystream was generated from encryption keystream data that was transmitted with said scrambled video information lines, and wherein provision of said encryption keystream for setting the cutpoint was delayed in accordance with said encryption keystream, said descrambling system comprising a memory;

means for storing in the memory scrambled video information lines;

means for forming descrambled video information lines by retrieving from the memory segments of said scrambled video information lines in a sequence that complements the sequence in which said segments were retrieved to form said scrambled video information lines;

means for receiving said transmitted encryption keystream data;

means for generating from the received encryption keystream data, a decryption keystream that is identical to said encryption keystream;

means for setting said cutpoint between the segments of said stored scrambled video information lines in accordance with said decryption keystream;

means for delaying provision of said decryption keystream to said means for setting the cutpoint; and means for setting said delay in accordance with said decryption keystream.

15. A system according to claim 14 for descrambling said video information lines, wherein during the scrambling thereof said provision of the encryption keystream to said means for setting the cutpoint was delayed for a predetermined number of video information lines regardless of the encryption keystream and further delayed for a number of video information lines as indicated by the encryption keystream;

wherein within the descrambling system, the delaying means are adapted for delaying said provision of the decryption keystream to said means for setting the cutpoint for said predetermined number of video information lines regardless of the decryption keystream and for further delaying said provision of the decryption keystream to the means for setting the cutpoint for an additional number of video information lines as indicated by the encryption keystream.

* * * * *